Sept. 2, 1924.

H. J. COSFORD

SALT BOX FOR ANIMALS

Filed Nov. 23, 1922

1,507,159

Inventor
H.J.Cosford.
By Bernard F. Garvey
Attorney

Patented Sept. 2, 1924.

1,507,159

UNITED STATES PATENT OFFICE.

HERBERT J. COSFORD, OF MONDOVI, WISCONSIN.

SALT BOX FOR ANIMALS.

Application filed November 23, 1922. Serial No. 602,899.

*To all whom it may concern:*

Be it known that I, HERBERT J. COSFORD, a citizen of the United States. residing at Mondovi, in the county of Buffalo and State of Wisconsin, have invented certain new and useful Improvements in Salt Boxes for Animals, of which the following is a specification.

The present invention relates to improvements in salt boxes for animals and has for an object to provide a box of very simple construction which may be conveniently used by animals without possibility of injury.

A co-ordinate object of the invention is to provide a water-tight and dust proof box of this character which, however, is so constructed that the salt may be smelt by the animals as soon as they are in proximity to the box, access being readily gained to the salt and partaken by the animals without loss.

The above and other objects of this invention will be better understood from the following description of the present form of the invention taken in connection with the accompanying drawings wherein:—

It is well known in the art to provide salt boxes, feeding troughs, etc. which are operated by the animal and consequently the present invention is designed merely as an improvement over the present art. The improvements in the present instance consist in the provision of a device which is exceptionally simple in construction yet is characterized by advantages which make the device practical from a structural, utilitarian and monetary standpoint. As will be hereinafter appreciated the device is so constructed that it is water-tight and dust proof yet so constructed that the odor of the salt will make its location known to animals feeding in proximity to the box.

The device of the present invention consists of a box body generally designated by the numeral 4 the bottom 5 of which is inclined downwardly toward its longitudinal center in order to provide a channel for the salt approximately midway the front and rear of the box. The rear wall 6 of the box is also inclined to facilitate gravitation of the salt in an apparent manner. By this construction of the rear wall and bottom of the box, the salt will at all times have a tendency to gravitate toward the longitudinal center of the bottom of the box with obvious accessibility to the animals. The top 7 of the box is of gable construction to expeditiously shed the elements therefrom in an apparent manner.

Figure 1:
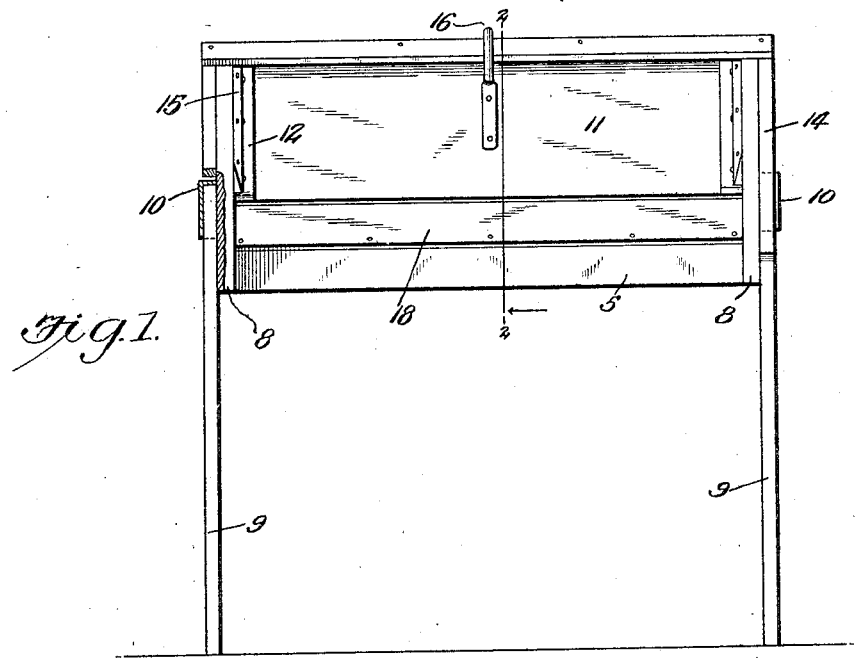
Fig. 1 is a front elevational view of a salt box constructed in accordance with this invention, a portion thereof being broken away to disclose details.
Figure 2:
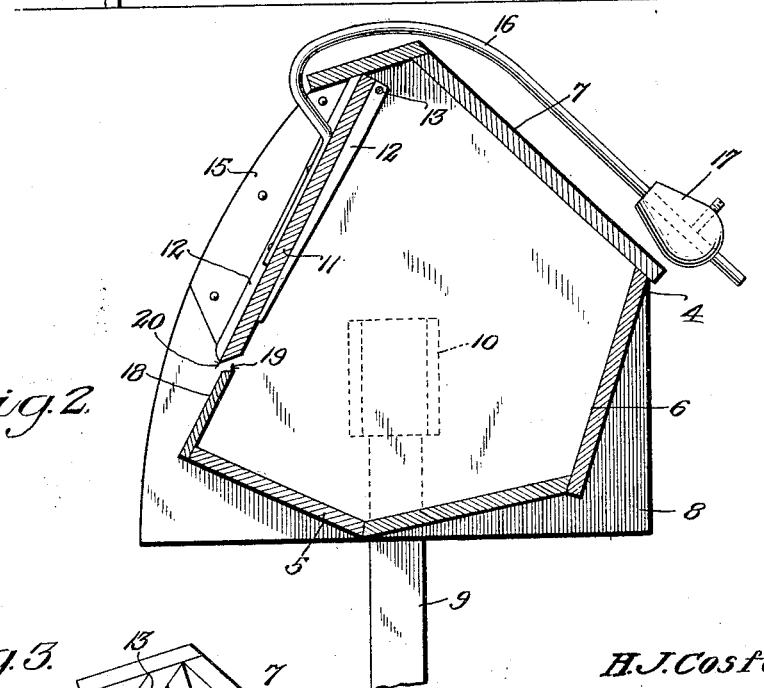
Fig. 2 is a vertical sectional view taken on the line 2—2 of Fig. 1 looking in the direction of the arrow.
Figure 3:
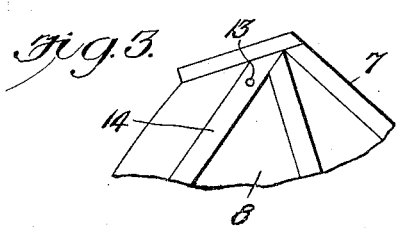
Fig. 3 is a fragmentary and elevational view of the box showing to advantage the bracing structure on one end of the box.

If desired, the ends 8 of the box may be provided with horizontal lower margins, so as to be adapted for engagement with a horizontal supporting base, as shown in Fig. 2 of the drawings. However, it is believed to be preferable to elevate the box an appreciable distance above the surface of the ground so as to make the same more accessible to the animals and to minimize possibility of dirt, vermin, etc., from entering the salt box. With this end in view I have provided supporting legs 9 which may have the upper ends thereof mounted in metal straps 10 secured to the ends 8 of the box.

The front of the box is equipped with a hinged wall 11 capacitating as a door. This door is faced at both ends with reinforcing ribs 12, the ribs on the inner face of the door being provided with openings through which a rod 13 extends. The rod 13 serves as the axis for said door 11 and has the ends thereof mounted through the ends 8 of the box and journaled in reinforcing struts 14 which are mounted upon said box ends 8. The reinforcing ribs 12 on the outer face of the door are adapted to impinge abutments 15 which latter are secured to the inner faces of the box end 8 as illustrated to advantage in Fig. 2. The abutments 15 retard outward movement of the door 11.

It is apparent from the above that the door 11 may be moved inwardly by the exertion of pressure thereon in order to permit access to be gained to the contents of the box. In order to automatically close the door and maintain the same in a closed position, suitable means has been provided. The means in the present instance consists of a rod 16 one end of which is secured to the front face of the door 11 while the opposite end extends over the top 7 of the box and is equipped with an adjustable weight 17. The weight may be adjusted on the rod in an apparent manner to keep the door snugly engaged with the abutments 15.

Particular attention is directed to the fact that a portion 18 of the front wall of the box is stationary and has the upper margin thereof beveled as indicated at 19. Moreover, the lower marginal edge of the door 11 is beveled in a counter direction as indicated at 20. By disposing the weighted end of the rod toward the rear of the box body, interference of the weight with the animal while feeding is prevented. The wall 18 and door 11 are so positioned that when the door is in a closed position an open space is provided between the lower marginal edge of the door and the upper margin of the wall 18, as shown to advantage in Fig. 2. It is through this opening that the odor of the salt is permitted to pass and the animals in attempting to gain access thereto will press inwardly on the door 11. By beveling the upper marginal edge of the wall 18, loss of salt will be reduced to a minimum. Morever, by arranging the beveled margins 19 and 20 as shown in Fig. 2 a relatively small space is thereby provided yet there is ample clearance for the door to move on its axis without hindrance.

Upon reference to Fig. 2 of the drawings it will be noted that the abutments 15 are so formed that the door 11 may swing outwardly to a point where its outer face is beyond the plane of the outer face of the wall 18 thereby serving as a shed for rain and other elements to minimize possibility of water seeping into the salt.

It is of course to be understood that this invention may be made of any desired size and from any desired material. The construction herein illustrated embodies the principle of the invention and shows merely one type of box which may be employed in reducing the invention to practical fields.

What is claimed is:—

1. A salt box for animals including a box body one of the sides of which is hinged and movable by the head of the animal, a rod one end of which is secured to the hinged side of said body and the opposite end extended over the top of the latter and terminated beyond the back wall of the box body, and a weight adjustably mounted on said rod.

2. A salt box for animals including a box body equipped with a movable door the free margin of which is beveled, the margin of the box body, adjacent the said beveled margin of the door being also beveled whereby portions of said door and box margin overlap, said overlapped portions being spaced to permit the odor of the contents of said box to be emitted.

HERBERT J. COSFORD.